March 20, 1951 V. E. GLEASMAN ET AL 2,546,066
TAPER TAP
Filed May 31, 1945 2 Sheets-Sheet 1
Fig.1.
Fig.2.
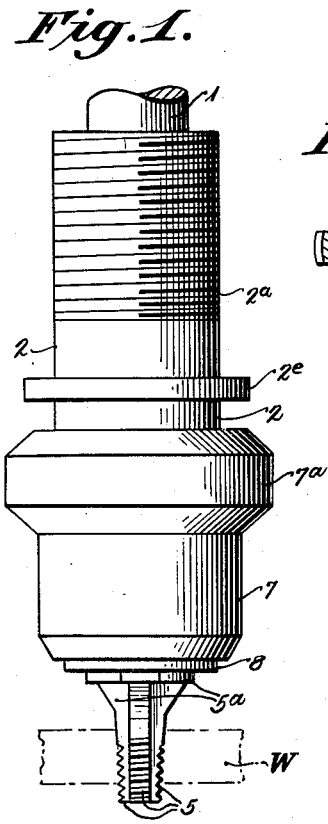
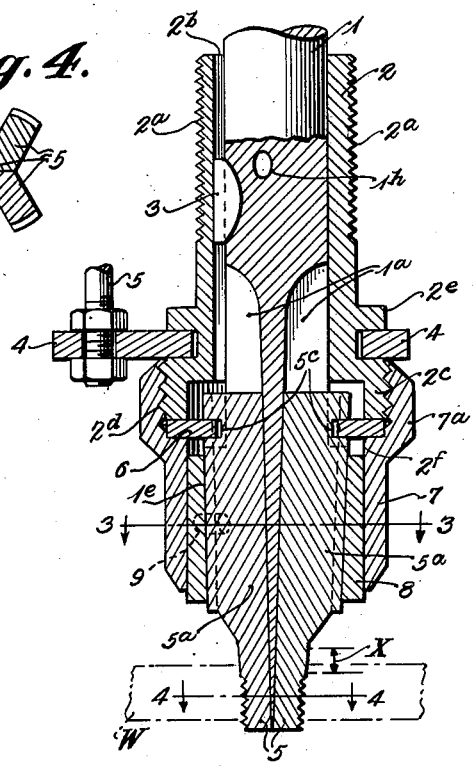
Fig.2ª
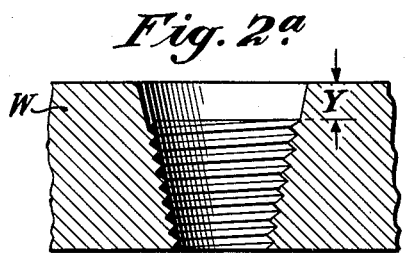
Fig.3ª
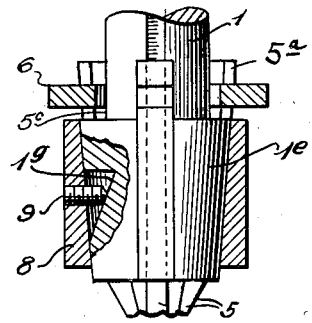
Fig.3.
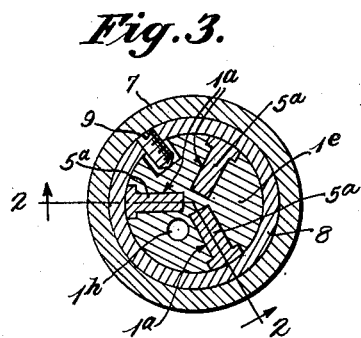
Inventors
Vernon E. Gleasman
and
Hollis K. Gleasman
By
Alexander Dowell
Attorneys March 20, 1951   V. E. GLEASMAN ET AL   2,546,066
TAPER TAP Filed May 31, 1945   2 Sheets-Sheet 2

Inventors
Vernon E. Gleasman
and
Hollis K. Gleasman

By
Alexander ____
Attorneys

Patented Mar. 20, 1951

2,546,066

UNITED STATES PATENT OFFICE 2,546,066

TAPER TAP

Vernon E. Gleasman and Hollis K. Gleasman, Elmira, N. Y.

Application May 31, 1945, Serial No. 596,874

17 Claims. (Cl. 10—142)

Our invention is a novel mechanical tap adapted to cut tapered or pipe threads in work, such as plates, bars or the like, after the holes have been punched or drilled therein in a manner that eliminates steps that are ordinarily left by other taper taps.

One object of the invention is to provide a machine driven tap of the above type utilizing chasers having shanks extended above or beyond the plane of the work whereby the entire controlling mechanism of the chasers is disposed above or beyond the plane of the work being tapped, utilizing extended shanks on the chasers assembled in a housing carried by the rotating shaft, the chasers being arranged for positive action without necessitating key slots, and the chasers being slidable down slots in the drive shaft, the movement being controlled by a lead screw which is axially movable on and rotatable with the rotating shaft.

Another object of our invention is to provide a manually rotated tap having a similar chaser shank arrangement within a housing carried by the shaft above or beyond the plane of the work being tapped; said housing being axially shiftable on the shaft whereby when the chasers enter the hole in the work the assembly will be drawn down by the lead of the chasers to form the tapered threaded hole; means being provided on the assembly adapted to engage the work whereby when the chasers have penetrated into the work a predetermined distance the shaft will be prevented from further movement towards the work thereby fixing or determining the diameter of the threaded hole.

A still further object of our invention is to provide mechanical taps of the above type with novel chasers having means thereon for forming a smooth countersink in the upper or larger end of the threaded hole in the work, the threaded lower portion of the hole and the unthreaded countersink in the upper portion being adapted to receive correspondingly shaped portions on the pipe or the like which is to be threaded in the hole, thereby effecting an efficient liquid seal dispensing with the necessity of providing extraneous packing or sealing operations.

Other minor objects of our invention will be hereinafter set forth.

We will explain the invention with reference to the accompanying drawings, which illustrate several practical embodiments thereof, to enable others familiar with the art to adopt and use the same; and will summarize in the claims the novel features of construction, and novel combinations of parts, for which protection is desired.

In said drawings—

Figure 1 shows an elevation of one form of mechanical machine driven tap embodying our invention, and showing in dotted lines the chasers engaged in the hole in the work.

Fig. 2 is a vertical section through the tap shown in Figure 1.

Fig. 2a is an enlarged section through the work showing the tapped hole cut by our tap showing the countersink at the upper or larger end of the tapped hole.

Fig. 3 is a transverse section on line 3—3, Fig. 2.

Fig. 3a is a detail of the arrangement of the adjusting screw.

Fig. 4 is an enlarged transverse section on the line 4—4, Fig. 2.

Figure 6:
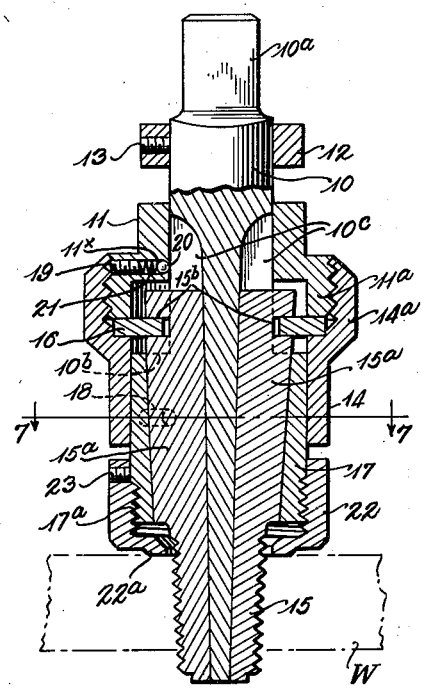
Fig. 6 is a vertical section through the tap shown in Fig. 5.

As shown in Figs. 1 and 4, the tap is adapted for machine taping in which the machine has a precision ground lead screw carrying the tap for entry into the hole in the work, but, however, the tap in said Figs. 1 to 4 may be utilized in machines which are not provided with such lead screws. Shaft 1 is adapted to be mounted for rotation with a rotating head (not shown), the said shaft 1 being slidable in the head and rotating therewith. Shaft 1 is preferably cylindrical and has adjacent its lower end a substantially cylindrical enlarged head provided with radially disposed slots 1a of generally rectangular shape evenly spaced around the circumference of the shaft, three such slots 1a being shown in Figures 2 and 3. However, a greater or lesser number of spaced slots 1a may be provided. In Fig. 3 the slots are shown as of T-shaped, cross section, with the wider portion of the slots disposed at the outer surface of the shaft, for the purpose hereinafter described. The bases of slots 1a may each taper downwardly and inwardly to the end of the shaft 1 at which point the bases of the slots converge as shown in Fig. 2; however, for larger taps the bases of the slots 1a may be separated by a reduced thickness of the shaft at the lower end of the shaft 1 as shown in Fig. 6, the provision of the hollow at the lower end of the shaft 1 permitting the use of taps for threading holes of very small diameters.

Rotatable with the shaft 1 is a sleeve 2 which is threaded as at 2a for mounting upon a stationary member of the machine (not shown), said sleeve 2 having a keyway 2b in its bore extending the full length thereof and receiving a key 3 mounted in shank 1 and slidably engaging the keyway 2b, thus causing rotation of the sleeve 2 with the shaft as the latter is rotated, the sleeve 2 being movable axially of the shaft 1. At the lower end of sleeve 2 is an enlarged tubular head 2c which is externally threaded as at 2d for the purpose hereinafter explained, and on the exterior of sleeve 2 above the head 2c but spaced therefrom is an annular flange 2e, flange 2e and the top of head 2c forming a groove in the sleeve 2 for receiving a reversing collar or yoke 4, which collar 4 is connected by an arm or rod 5 or the like to the reversing mechanism (not shown) of the machine. In the lower end of the head 2c is an enlarged bore 2f for the reception of the upper extended shanks 5a of the chasers 5, hereinafter described.

Within each of the slots 1a of shaft 1 is the shank 5a of a chaser 5, three such chasers being shown in Fig. 3, said shanks 5a being of the same width as the slots 1a in shank 1 but extending outwardly to lie flush with an enlarged head 1e of the lower portion of the shaft 1 within the bore 2f of the portion 2c of sleeve 2. Head 1e is slightly conical, the walls thereof being disposed parallel with and sloping in the same direction as the converging bases of slots 1a, so that the depth of the slots 1a is constant from top to bottom in the head 1e.

In order to maintain the shanks 5a of the chasers in the slots 1a, the chasers are provided adjacent the upper ends with transverse slots 5c in their outer faces, said slots 5c being all disposed in the same plane and adapted to receive a washer 6 preferably formed of two halves for convenience of assembly, the outer periphery of the washer contacting the lower end of head 2c of sleeve 2 and being retained in place thereon by a sleeve 7 having an enlarged head 7a at its upper end internally threaded to receive the external threads on the lower end of head 2c of sleeve 2, the washer 6 being confined between the heads of sleeve 7 and sleeve 2.

The bore of sleeve 7 is cylindrical and of larger diameter than the head 1e of shaft 1, and between the periphery of head 1e and the wall of the bore of sleeve 7 is a collar 8 having its outer wall cylindrical in shape and its inner wall conical and of taper corresponding with the enlarged head 1e of shaft 1. Collar 8 is retained in position on head 1e by means of a set screw 9, Figs. 3 and 3a, in a threaded bore in the collar 8 with the inner end engaging the base of a slot 1g in head 1e, the base of the slot 1g being inclined in the opposite direction from the taper of the inner wall of collar 8, whereby the collar 8 may be shifted vertically upon head 1e and when the set screw 9 is tightened, the inner end engaging the inclined sloping base of slot 1g, will draw the collar upwardly. Any other means, however, may be provided for adjusting collar 8 on head 1e.

As shown in Figs. 2 and 3, a bore 1h is provided extending down through shaft 1 and its head 1e, and terminating adjacent the center of the lower end of the shaft, whereby a drilling compound, lubricant, or the like may be fed directly to the chasers 5 during operation.

The threaded portions of the chasers 5 at the lower ends thereof as shown in Figs. 1 and 2 are of usual type, the same being tapered at the same angle throughout their cutting lengths and being threaded throughout the line of taper. However, I preferably omit the threads on the chasers of their upper portions throughout the extent indicated at X (Fig. 2) in order that the chasers will first tap the pre-drilled hole in the work W, in the usual manner and shown in Fig. 2a, but the upper portion of the tapped hole throughout the extent indicated by Y will remain unthreaded and in the nature of a countersink extending upwardly from the major diameter of the threads parallel with the taper of the threads or any other angle, the threaded lower portion of the hole in work W and the unthreaded portion Y of the hole being adapted to receive correspondingly shaped portions on the pipe or the like which is to be threaded into the tapped hole in work W, the corresponding countersunk portions Y of the work and on the pipe thereby effecting an efficient liquid seal dispensing with the necessity of having to provide extraneous packing or sealing operations.

As previously stated, the lower end of shaft 1 at the lower ends of slots 1a is hollow, thus permitting the use of chasers 5 of very narrow width as indicated in Fig. 4, and preferably the inner edges of the chasers 5 are triangularly shaped so as to actually abut at their lower ends as shown. By this arrangement the minimum diameter of hole that can be tapped is limited only to the torsional strength of the narrow widths of the chasers 5 at their lower contacting or abutting ends.

The use of the T-slots 1a in shaft 1 having their wider portions at the surface of the head 1e permits the use of T-shaped shanks 5a for the chasers which will give a wider bearing surface to the outer faces of the shanks on the collar 8, thus materially reducing wear between the shanks and collar and lengthening the time between trueing or machining of the shanks. In event, however, of wear on the outer faces of shanks 5a it will be necessary to remove some stock from the outer face of the head 1e of shaft 1, which would require that the sleeve 8 be shifted vertically with respect to head 1e to provide contact between the said parts. This shifting of sleeve 8 may readily be accomplished by merely tightening the set screw 9, Fig. 3a, the mere tightening of the screw serving to lift the sleeve 8 vertically with respect to head 1e.

The assembly shown in Figs. 1-4 thus provides a completely enclosed arrangement of the working parts of the tap, with the exception of the cutting ends of the chasers 5 themselves; and also provides a compact arrangement adapted particularly for tapping small holes, the chasers 5 sliding down the slots 1a in shaft 1 but controlled by the extended shanks 5a of the chasers.

In operation, the assembly shown in Fig. 2 would be mounted upon the tapping machine, so that the shaft 1 will be rotated by the usual machine spindle, and threads 2a of sleeve 2 engaged in the fixed member of the machine. Collar or yoke 4 would be held initially in raised position by the machine before starting operations so as to bring the shanks 5a of the chasers 5 adjacent the upper ends of the slots 1a. As the shaft 1 is revolved, owing to the keyed connection between shaft 1 and sleeve 2, the sleeve 2 will be fed downwardly in the fixed member of the machine, and the chaser shanks 5a which are connected to the sleeve 2 by the split washer 6 will be correspondingly fed downwardly as sleeve 2 is advanced until the cutting lower ends of chasers 5 enter the hole in the work W. As shaft 1 continues to rotate, the chasers 5 will be continually fed downwardly with sleeve 2, the lower ends of the chasers coming closer together by reason of the taper of the bases of the slots 1a, and the dies on chasers 5 will commence to tap the predrilled or punched hole in the work W, the tapping continuing until the downward movement of the collar or yoke 4 actuates at a predetermined elevation the reversing mechanism of the machine, whereupon the shaft 1 will be rotated by the machine in the opposite direction and the chasers 5 rotatively withdrawn from the hole in the reverse direction of rotation to that by which they were originally entered into the work, thus insuring that the cut threads in the work will not be injured. The countersink portion Y (Fig. 2a) will be formed in the work before yoke 4 actuates the reversing mechanism.

Figure 5:
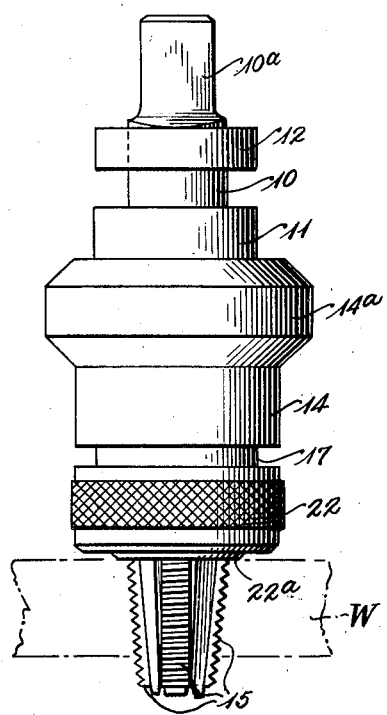
Fig. 5 shows an elevation of a modified tap used for tapping the hole by hand.
Figure 7:
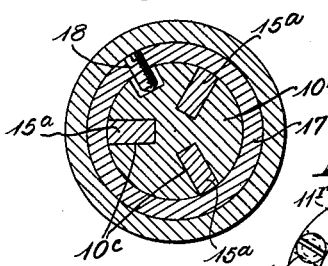
Fig. 7 is a transverse section on the line 7—7, Fig. 6.

In the modification shown in Figs. 5–7 inclusive, the tap is designed for hand tapping the hole with work W, and the parts are generally similar to those previously described, like parts being similarly numbered. In this modification the shank or shaft 10 has a non-circular upper end 10a for engagement with a hand wrench or the like, the lower end of the shank or shaft 10 having an enlargement 10b similar to the enlarged head 1c of shaft 1 of Figs. 1–4, and the enlarged head 10b is provided with the radial slots 10c similar to the slots 1a of Figs. 1–4, the bases of the slots 10a tapering downwardly and inwardly; but in this modification a small amount of shank or shaft stock is left between the bases of the slots 10a at the lower end of the shank or shaft. However, the taper may be similar to that above described in connection with the preceding figures, and thus the lower end of the shank or shaft 10 may be hollow, if desired, particularly for taps primarily designed for tapping relatively small holes.

In this modification a sleeve 11 is slidably mounted upon shank or shaft 10 above the head 10b and below an adjustable limiting collar 12 on the upper end of shank 10 maintained in adjusted position by a set screw 13, Fig. 6. Sleeve 11 is provided with an enlarged head 11a corresponding with the enlarged head 2c of sleeve 2 (Fig. 2), said sleeve being externally threaded to receive the internal threads on the enlarged head 14a of a sleeve 14 similar to the sleeve 7 (Fig. 1).

Within the slots 10c are axially slidably mounted the extended shanks 15a of the chasers 15, the shanks 15a being similar to the shanks 5a of chasers 5 (Fig. 2), said shanks 15a having transverse slots 15b engaged by a split or sectionalized washer 16 confined between the lower end of sleeve 11 and the shoulder within the head 14a of sleeve 14, whereby the chasers 15a will move axially of shank 10 in unison with the sleeves 11 and 14.

In this modification the shanks 15a are rectangular as shown in Fig. 7, rather than T-shaped, although the same may be T-shaped if desired, and the outer faces of the chasers 15a are flush with the outer face of the enlarged head 10b as in the preceding figure, the outer face of the head 10b being slightly conical and parallel with the taper of the bases of the slots 10c, for the same reasons stated regarding the preceding figures.

Around the outer faces of the chaser 15a and the head 10b of shaft 10a is a collar 17 similar in all respects to the collar 8 (Fig. 2), the collar 17 having a cylindrical outer wall slidably fitting the cylindrical bore of sleeve 14, and having a conical inner wall corresponding in taper with that of the bases of the slots 10c and engaging the outer wall of head 10b of shank or shaft 10, the collar 17 being retained in position on the head 10b by means of a set screw 18 arranged similarly to the set screw 9 of Figs. 3 and 3a.

In this modification means are provided for yieldably maintaining the assembly carried by sleeves 11 and 14 raised against the collar 12 when manually thus raised. For this purpose a bore 11x (Fig. 6) is provided in the head 11a of sleeve 11 disposed at right angles to shank or shaft 10, said bore having a tapped outer end receiving a screw 19; and between the screw 19 and the shank or shaft 10a is a ball or shoe 20 yieldably urged toward the shank 10 by a coiled spring 21, the ball or shoe 20 thus making frictional contact with the shank or shaft 10 to maintain the assembly raised against the collar 12 prior to tapping operation.

The lower end of the collar 17 is externally threaded as at 17a to receive the internal threads on a limiting collar 22 which is adjustably retained on the collar 17 by a set screw 23. The collar 22 has an axial opening in its base 22a for the passage therethrough of the cutting ends of the chasers 15. The base of collar 22 serves to limit the downward movement of shank or shaft 10 during the cutting operation, and thereby limits the diameter of the threads cut in the work W by the chasers 15.

In operation, the assembly of the sleeve 11, washer 16, and the chasers 15a are initially moved up on shaft 10 to contact the collar 12, while the shaft 10a with its head 10b and the collar 17 remain in fixed position. A wrench or other tool is then applied to the non-circular end 10a of the shank or shaft 10, or a non-circular driving member of a machine may be thus applied to shank 10a, and the shank 10 thereby rotated with the lower or die portions of the chasers 15 engaging the work at the upper end of the predrilled or punched hole in work W. As the shank or shaft 10 is rotated in a cutting direction the chasers 15 will enter the work W and thereby draw the shank 10 and assembly thus positioned down into the work by its lead, cutting the threads in the work W as the chasers 15 rotate with the shank or shaft 10. This operation will continue until the lower end 22a of the collar 22 engages the top of work W which is the position of parts shown in Fig. 6, whereupon collar 22 will prevent the shank 10 from progressing further downwardly into the work. Continued rotation of the shank 10, however, will rotate the chasers 15 therewith while the shank 10 is held against downward movement, and the chasers 15 will draw the assembly downwardly by its own lead to complete the cutting of the threads to the predetermined or adjusted diameter determined by the setting of collar 22. After the threads have been completely cut through the work W, rotation of shank or shaft 10 is reversed, by hand or machine, and the entire assembly will recede by a backing-out operation from the work in the reverse manner in which it was entered, thereby withdrawing the chasers 15 from the work without injuring the threads.

Figure 8:
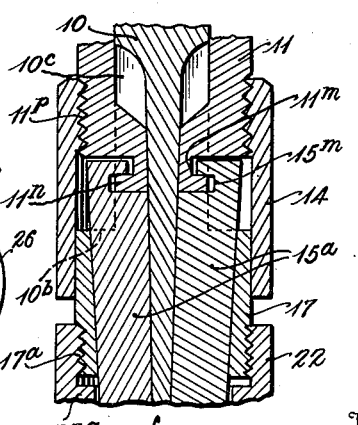
Fig. 8 is a vertical section through a portion of the tap shown in Fig. 6 but showing a modified sleeve arrangement.
Figure 10:
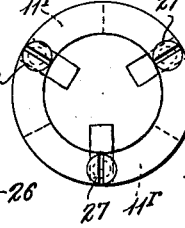
Fig. 10 is a top plan view of the parts shown in Fig. 9.
Figure 9:
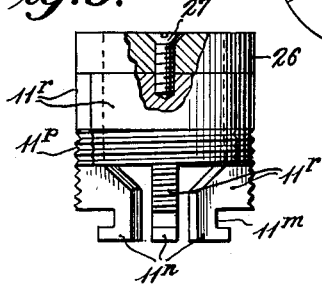
Fig. 9 is an elevation of the segmental sleeve shown in Fig. 8, detached.

In the modification shown in Figs. 8-10 inclusive, the parts are in general substantially similar to those shown in Figs. 5-7 inclusive, and similar parts are similarly numbered. In this modification, however, in order to further reduce the overall diameter of the sleeve 14 by eliminating the enlargement 14a, the upper ends of the shanks 15a of chasers 15 are actuated internally by a collar rather than externally by the washer 16 in Fig. 6.

In this modification the upper ends of the chaser shanks 15a are provided with undercut transversely disposed slots receiving a disk-shaped head 11n on an axially disposed extension 11m depending from the lower end of sleeve 11 which otherwise serves the same function as the sleeve 11 in Fig. 6, the engagement of the head 11n in slots 15m causing the chaser shanks 15a to move in unison with sleeve 11 axially of shank or shaft 10. In sleeve 11 the enlarged head 11a (Fig. 6) is omitted, the sleeve being cylindrical and provided at its upper end with external threads 11p receiving corresponding internal thread on the cylindrical sleeve 14 in general similar and serving the same purpose as the sleeve 14 in Fig. 6. Thus by the above arrangement the sleeves 11 and 14 are secured together, and sleeve 11 actuates the shanks 15a of the chasers.

For convenience in assembly of sleeve 11 with the head 11n of extension 11m engaged in the recesses 15m of the chasers 15a as shown in Fig. 8, the extensions 11m, Fig. 9, are formed on separate arcuate members 11r which together form a tubular unit around the shank or shaft 10, each member extending through an arc, said members 11r having formed in their outer walls adjacent the lower ends thereof the threads 11p for sleeve 14, the sleeve 14 holding the members 11r together and further serving as a shield to exclude dirt, dust and the like from the parts within the sleeve. In order to further secure the arcuate members 11r together a washer 26 (Fig. 9) of same external and internal diameter as the members 11r of the sleeve 11 is seated upon the tops of the members 11r and secured thereto by screws 27 extending through spaced holes therethrough and threaded into tapped bores in the upper ends of the members 26 as shown more particularly in Figs. 9 and 10, the collar 26 and screws 27 thereby serving to hold the members 11r together as a unit in addition to the sleeve 14, thus providing a rigid structure.

The operation of the tap shown in Figs. 8-10, inclusive, is otherwise the same with that above described in connection with Figures 5-7 inclusive, the sleeve 17 of Fig. 8 also carrying the limiting collar 22 which is identical in all respects with that shown in Figure 6.

We do not limit our invention to the exact forms shown in the drawings, for obviously changes may be made therein within the scope of the claims.

We claim:

1. A mechanical tap for threading preformed holes in plates or other work, comprising a rotatable shaft having an annular series of longitudinally extending slots therein with bases converging towards the axis of the shaft at its outer end; chasers having extended shanks axially slidable in the said slots respectively and having pipe thread cutting dies on their outer ends adapted to enter the preformed hole in the work; the bases of said slots communicating at the outer end of the shaft; and the contacting faces of the chasers being angularly cut to permit close interfitting at their outer ends beyond the shaft; an axially movable sleeve on said shaft around the shanks in said slots; means connecting the sleeve and shanks for causing simultaneous movement thereof; and means responsive to axial movement of said shanks in said slots for limiting the movement of the sleeve towards the work.

2. In a tap as set forth in claim 1, said cutting threads being tapered and said chasers having plain portions above the cutting threads having reaming edges continuing in line with the taper of the threads, and adapted to form a countersink in the work extending from the major diameter of the threads in the work.

3. A mechanical tap for threading preformed holes in plates or other work, comprising a rotatable shaft having an annular series of longitudinally extending slots therein with bases converging towards the axis of the shaft at its outer end; said shaft having its walls contracting conically parallel with the bases; chasers having extended shanks axially slidable in the said slots respectively and having pipe thread cutting dies on their outer ends adapted to enter the preformed hole in the work; the bases of said slots communicating at the other end of the shaft; and the contacting faces of the chasers being angularly cut to permit close interfitting at their outer ends beyond the shaft; an axially movable sleeve on said shaft around the shanks in the slots; means connecting the sleeve and shanks for causing simultaneous movement thereof; and means responsive to axial movement of the shanks on said slots for limiting the movement of the sleeve towards the work.

4. In a tap as set forth in claim 3, said cutting threads being tapered, and said chasers having plain portions above the cutting threads having reaming edges continuing in line with the taper of the threads, and adapted to form a countersink in the work extending from the major diameter of the threads in the work.

5. A mechanical tap for threading preformed holes in plates or other work, comprising a rotatable shaft having an annular series of longitudinally extending slots therein with bases converging towards the axis of the shaft at its outer end; said shaft having its walls contracting conically parallel with the bases; chasers having extended shanks axially slidable in the said slots respectively and having pipe thread cutting dies on their outer ends adapted to enter the preformed hole in the work; an axially movable sleeve on said shaft having a cylindrical portion housing the conical portion of the shaft; means connecting the sleeve and shanks for causing simultaneous movement thereof; a collar having a conical bore conforming with and snugly receiving the conical portion of the shaft, and having a cylindrical outer wall of external diameter slidably fitting the cylindrical portion of the sleeve; means carried by the collar for securing the collar to said shaft; and means responsive to axial movement of said shanks in said slots for limiting movement of the sleeve towards the work.

6. In a tap as set forth in claim 5, said chasers having plain portions above the cutting threads having reaming edges continuing in line with the taper of the threads, and adapted to form a countersink in the work extending from the major diameter of the threads in the work.

7. In a tap as set forth in claim 5, said securing means comprising a conical portion of the shaft having a recess having its bottom inclined in an opposite direction from that of the wall of the shaft; and a set-screw tapped through the said collar and engaging the bottom of the recess.

8. In a tap as set forth in claim 5, the bases of said slots communicating at the outer end of the shaft; and the contacting faces of the chasers being angularly cut to permit close interfitting at their outer ends beyond the shaft.

9. A mechanical tap for threading preformed holes in plates or other work, comprising a rotatable shaft having an annular series of longitudinally extending slots therein with bases converging towards the axis of the shaft at its outer end; chasers having extended shanks axially slidably in the said slots respectively and having pipe thread cutting dies on their outer ends adapted to enter the preformed hole in the work; an axially movable sleeve on said shaft around the shanks in said slots; means connecting the sleeve and shanks for causing simultaneous movement thereof; and means for limiting the movement of the sleeve towards the work; said shaft being rotatable with the head of a tapping machine provided with shaft reversing mechanism; said sleeve having an exteriorly threaded upper end adapted to be threaded into a fixed support in the tapping machine; said sleeve being splined to the shaft for rotation therewith; and said limiting means comprising an annular groove in the sleeve, and a yoke in said groove actuating the reversing mechanism of the tapping machine.

10. A mechanical tap for threading preformed holes in plates or other work, comprising a rotatable shaft having an annular series of longitudinally extending slots therein with bases converging towards the axis of the shaft at its outer end; said shaft having its walls contracting conically parallel with the bases; chasers having extended shanks axially slidable in the said slots respectively and having pipe thread cutting dies on their outer ends adapted to enter the preformed hole in the work; an axially movable sleeve on said shaft around the shanks in the slots; means connecting the sleeve and shanks for causing simultaneous movement thereof; and means for limiting the movement of the sleeve towards the work, said shaft being rotatable with the head of a tapping machine; said sleeve having an exteriorly threaded upper end adapted to be threaded into a fixed support in the tapping machine; said sleeve being splined to the shaft for rotation therewith; and said limiting means comprising an annular groove in the sleeve, and a retracting yoke in said groove.

11. A mechanical tap for threading preformed holes in plates or other work, comprising a rotatable shaft having an annular series of longitudinally extending slots therein with bases converging towards the axis of the shaft at its outer end; said shaft having its walls contracting conically parallel with the bases; chasers having extended shanks axially slidable in the said slots respectively and having pipe thread cutting dies on their outer ends adapted to enter the preformed hole in the work; an axially movable sleeve on said shaft having a cylindrical portion housing the conical portion of the shaft; means connecting the sleeve and shanks for causing simultaneous movement thereof; a collar having a conical bore conforming with and snugly receiving the conical portion of the shaft, and having a cylindrical outer wall of external diameter slidably fitting the cylindrical portion of the sleeve; means for securing the collar to said shaft; and means on the sleeve for limiting movement of the sleeve towards the work; said shaft being rotatable with the head of a tapping machine; said sleeve having an exteriorly threaded upper end adapted to be threaded into a fixed support in the tapping machine; said sleeve being splined to the shaft for rotation therewith; and said limiting means comprising an annular groove in the sleeve, and a retracting yoke in said groove.

12. In a tap as set forth in claim 11, said connecting means comprising annular transverse recesses in the chaser shanks above the collar; and a washer fixedly mounted in the sleeve and engaging the recesses.

13. A mechanical tap for threading preformed holes in plates or other work, comprising a rotatable shaft having an annular series of longitudinally extending slots therein with bases converging towards the axis of the shaft at its outer end; chasers having extended shanks axially slidable in the said slots respectively and having pipe thread cutting dies on their outer ends adapted to enter the preformed hole in the work; an axially movable sleeve on said shaft around the shanks in said slots; means connecting the sleeve and shanks for causing simultaneous movement thereof; and means for limiting the movement of the sleeve towards the work; said shaft having a non-circular inner end; a stop collar adjustably mounted on the shaft above said sleeve; means carried by the sleeve for frictionally engaging the shaft to initially maintain same in contact therewith; and said limiting means comprising a second sleeve adjustably mounted on the lower end of the first sleeve and adapted to engage the adjacent face of the work.

14. A mechanical tap for threading preformed holes in plates or other work, comprising a rotatable shaft having an annular series of longitudinally extending slots therein with bases converging towards the axis of the shaft at its outer end; said shaft having its walls contracting conically parallel with the bases; chasers having extended shanks axially slidable in the said slots respectively and having pipe thread cutting dies on their outer ends adapted to enter the preformed hole in the work; an axially movable sleeve on said shaft around the shanks in the slots; means connecting the sleeve and shanks for causing simultaneous movement thereof; and means for limiting the movement of the sleeve towards the work; said shaft having a non-circular inner end; a stop collar adjustably mounted on the shaft above said sleeve; means carried by the sleeve for frictionally engaging the shaft to initially maintain same in contact therewith; and said limiting means comprising a second sleeve adjustably mounted on the lower end of the first sleeve and adapted to engage the adjacent face of the work.

15. A mechanical tap for threading preformed holes in plates or other work, comprising a rotatable shaft having an annular series of longitudinally extending slots therein with bases converging towards the axis of the shaft at its outer end; said shaft having its walls contracting conically parallel with the bases; chasers having extended shanks axially slidable in the said slots respectively and having pipe thread cutting dies on their outer ends adapted to enter the preformed hole in the work; an axially movable sleeve on said shaft having a cylindrical portion housing the conical portion of the shaft; means connecting the sleeve and shanks for causing simultaneous movement thereof; a collar having a conical bore conforming with and snugly receiving the conical portion of the shaft, and having a cylindrical outer wall of external diameter slidably fitting the cylindrical portion of the sleeve; means on the collar for securing the collar to said shaft; and means for limiting movement of the sleeve towards the work; said shaft having a non-circular inner end; a stop collar adjustably mounted on the shaft above said sleeve; means carried by the sleeve for frictionally engaging the shaft to initially maintain same in contact therewith; and said limiting means comprising a second sleeve adjustably mounted on the lower end of the first sleeve and adapted to engage the adjacent face of the work.

16. In a tap as set forth in claim 15, said connecting means comprising annular transverse recesses in the chaser shanks above the collar; and a washer fixedly mounted in the sleeve and engaging the recesses.

17. In a tap as set forth in claim 15, said shanks having undercut recesses in their upper ends, and said connecting means comprising a member of the sleeve above the shanks formed of arcuate sections having heads on their lower ends entering and conforming with the undercut recesses; means surrounding the sections for securing the sections together in assembled relation around the shaft; and means on the sections for securing the assembled sections to the adjacent portion of the sleeve.

VERNON E. GLEASMAN.
HOLLIS K. GLEASMAN.

REFERENCES CITED

The following references are of record in the file of this patent:

UNITED STATES PATENTS

| Number | Name | Date |
|---|---|---|
| 26,487 | Foster | Dec. 20, 1859 |
| 176,840 | Curtis | May 2, 1876 |
| 184,097 | Melvin | Nov. 7, 1876 |
| 196,879 | Cook | Nov. 6, 1877 |
| 346,103 | Holly | July 27, 1886 |
| 408,570 | Babbitt | Aug. 6, 1889 |
| 731,784 | Kelly | June 23, 1903 |
| 897,088 | Granstrom | Aug. 24, 1908 |
| 978,005 | Carll | Dec. 6, 1910 |
| 1,154,603 | Bettermann | Sept. 28, 1915 |
| 1,172,781 | Forsyth et al. | Feb. 22, 1916 |
| 1,249,240 | Summers | Dec. 4, 1917 |
| 1,384,020 | Kupke | July 5, 1921 |
| 1,581,023 | Saylor | Apr. 13, 1926 |
| 1,905,709 | Herman | Apr. 25, 1933 |

FOREIGN PATENTS

| Number | Country | Date |
|---|---|---|
| 113,110 | Germany | Aug. 30, 1900 |